Aug. 13, 1940.                H. OESCH                 2,211,288
        ROTARY VALVE IN A DISTRIBUTING DEVICE FOR PISTON ENGINES
                    Filed Jan. 19, 1939         2 Sheets-Sheet 1

INVENTOR
H. OESCH
By
Young, Emery & Thompson
ATTYS.

Aug. 13, 1940.  H. OESCH  2,211,288
ROTARY VALVE IN A DISTRIBUTING DEVICE FOR PISTON ENGINES
Filed Jan. 19, 1939  2 Sheets-Sheet 2

INVENTOR
H. OESCH
BY
Young, Emery & Thompson
ATTYS.

Patented Aug. 13, 1940

2,211,288

UNITED STATES PATENT OFFICE 2,211,288

ROTARY VALVE IN A DISTRIBUTING DEVICE FOR PISTON ENGINES

Hans Oesch, Berne, Switzerland

Application January 19, 1939, Serial No. 251,843
In Switzerland January 20, 1938

6 Claims. (Cl. 123—190)

The present invention relates to a rotary valve in a distributing device for piston engines and consists in a device permitting the tight fit between valve and cylinder head to be regulated.

The valve according to the present invention comprises at least one operative member fitted into the wall of the pressure chamber, and adapted to regulate the pressure between valve and cylinder according to the pressure in the pressure chamber. The particular arrangement of this member excludes misfires in internal combustion chambers, and affords a very favorable form of the combustion chamber.

The annexed drawings represent two embodiments of the subject of the present invention.

The drawings are described only in so far as the understanding of the invention requires.

Figure 1:
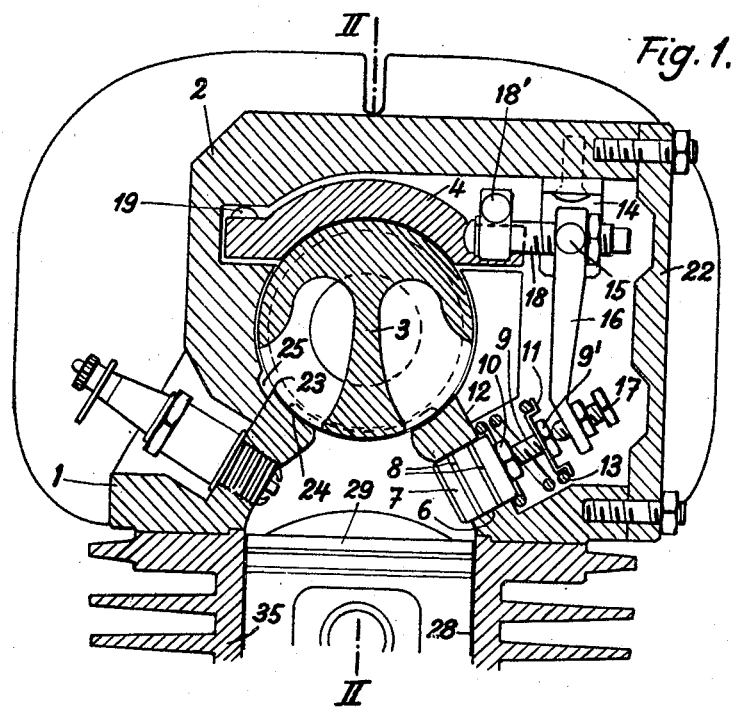
Fig. 1 is a cross section of a valve acted upon by two lever arms operated by said regulating member.

According to Fig. 1 there is a cylinder head made in two parts, a lower part 1 and an upper part 2, which latter attends, for the most part, to the cooling of the rotary valve 3. This valve is seated between parts 1 and 2 and the two lever arms 4 and 5. The lower part 1 of the cylinder head encloses a pressure chamber, and contains a bore 6 into which piston 7 is fitted. This piston carries piston rings 8 of the usual structure, and an axially arranged square headed screw 9 with adjusting nut 10. Screw head 10 is supported by a disc 11 which serves as abutment for a helical spring 13, inserted between said disc and the surface 12 of the lower part 1 of the cylinder head. This spring may be set by means of screw 9.

Figure 2:
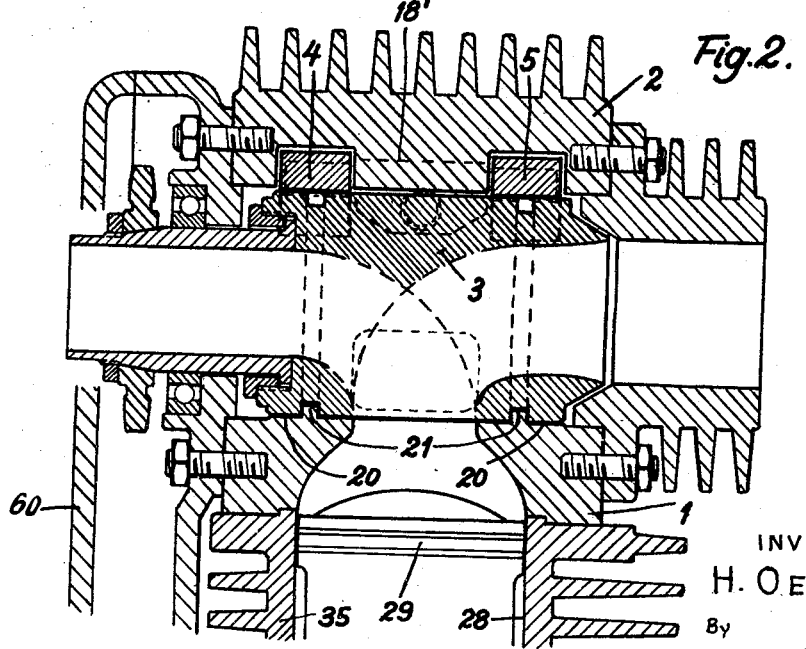
Fig. 2 is a longitudinal section on line II—II of Fig. 1.

A bell crank lever is pivoted at 15 to a bracket 14 fast to the upper part 2 of the cylinder head. The leg 16 of this lever carries at its free end a set screw 17, bearing against the head 9¹ of screw 9, so that the position of piston 7 may be adjusted even during the running of the engine. The free end of the leg 18 carries a pivoted cross beam 18', the ends of which bear upon the lever arms 4 and 5. Beam 18 is shaped like a screw bolt, and may therefore be adjusted in length. The two lever arms 4 and 5 rest by means of knobs 19 against the cylinder head, while their arched portions bear against the rotary valve 5 body. This arrangement of these lever arms permits of their automatic adjustment, and secures an exact contact with the valve. Near the tightening surfaces 20 (Fig. 2) of the valve are ledges 21 to prevent an axial displacing, and improve the tight fit in an axial sense.

The upper part 2 of the cylinder head is screwed fast to a bed plate 69, to which cylinder 35 is also attached.

Since the whole adjusting mechanism is inside the cylinder head, it may be shut off against dust and escape of oil by the covers 22. An edge 23 of the tightening surface 24 is intended for wiping off the oil, which is evacuated by a groove 25. This groove serves not only as wiping off member, but also as a member distributing the oil over the whole length of the valve. By the fact that this wiping-off edge is located next to the tightening surface, security is obtained for greasing said surface positively without any loss of oil.

The described arrangement operates as follows:

The working pressure in the combustion chamber of the cylinder tends to lift the valve from its contact with the cylinder head, but at the same time the pressure pushes piston 7 outwards. This piston presses the lever arms 4 and 5 by means of bell crank levers 16 and 18 upon the valve, and this valve upon the contact surfaces of the lower part of the cylinder head. Spring 13 prevents piston 7 from being sucked into the pressure chamber during the suction stroke, and is on the other hand, also provided for subjecting the bell crank lever and the lever arms to a certain contact pressure preventing any clattering noise. The upper part 2 of the cylinder head between the two lever arms 4 and 5, is kept close enough to the valve to secure a good transmission of heat.

The pistons 7 are arranged according to the best arrangement of the leverage, and the best form of the pressure chamber either obliquely or at right angles with respect to the cylinder axis.

Figure 3:
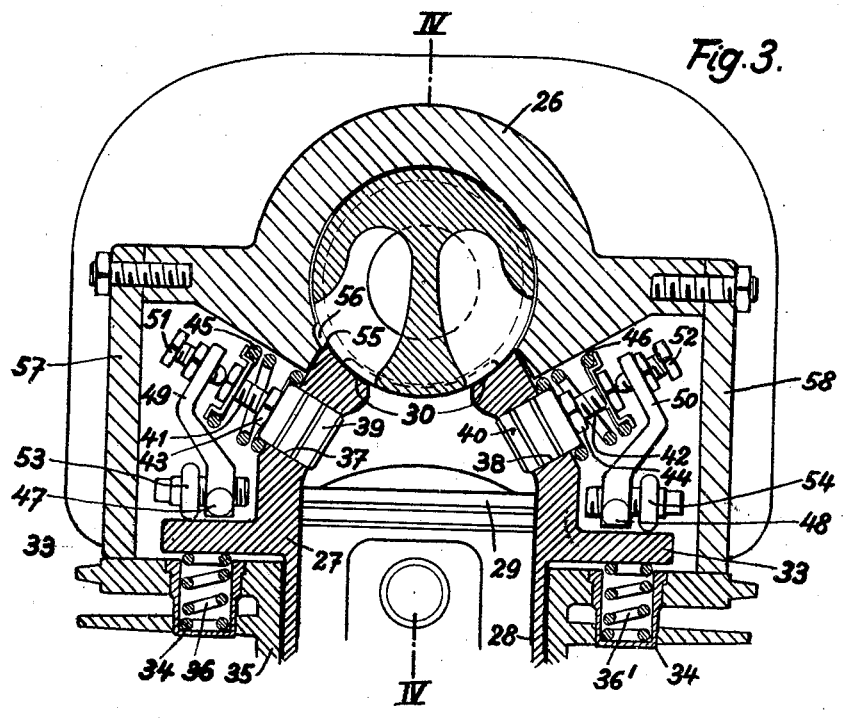
Fig. 3 is a cross section of a second embodiment, where the valve is seated in a head rigidly fast to the cylinder, while the pressure chamber is provided in a slidable sleeve which contains the pressure regulating members and the piston guide, and is pressed resiliently against the valve to hold it in position.
Figure 4:
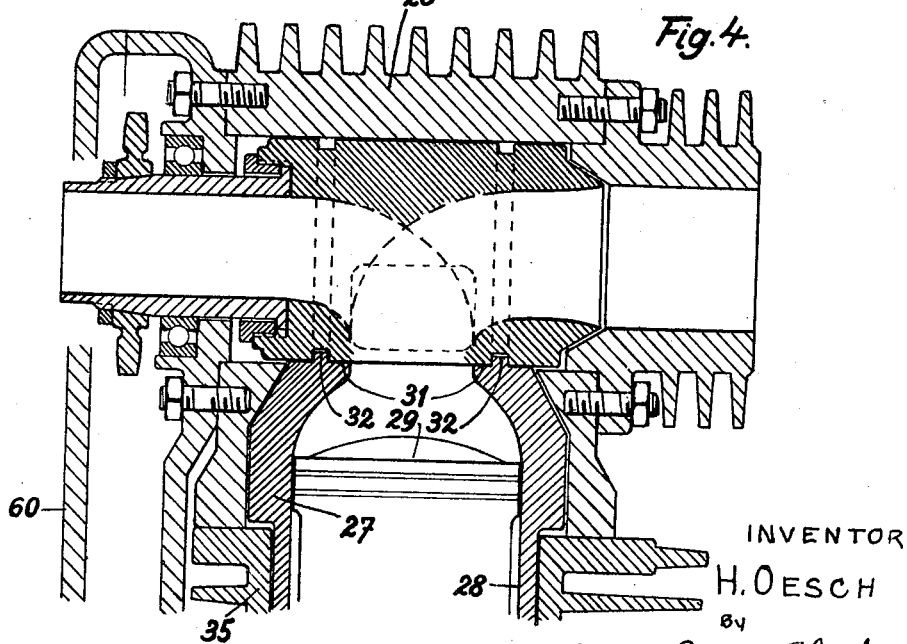
Fig. 4 is a longitudinal section on line IV—IV of Fig. 3.

In the embodiment according to Figs. 3 and 4, the cylinder head 26 is made in one part. In place of the lower part 1 of the cylinder head there is a sleeve 27 slidably arranged in the cylinder, and serving as guide 28 for the piston 29. By this arrangement the provision of a further tightening of the cylinder head is avoided. Sleeve 27 presents the contact surface 30 (Fig. 3), and 31 (Fig. 4) with the valve. This latter surface is provided with ledges 32 to prevent axial displacement of the valve, and to improve the tightness of contact.

Also in this embodiment, as in the former, the upper part 26 of the cylinder head is held rigidly in place by a bed plate 60, to which the cylinder itself is also attached.

The sleeve 27 rests by means of flanges 33 on springs 36, 36', held in thimbles 34, which are inserted into the cylinder 35. It encloses the pressure chamber, and is pressed against the valve seated in part 26 of the cylinder head. Bores 37, 38, are provided in the walls of the pressure chamber, and are arranged obliquely to the cylinder axis.

Here also, as in the first embodiment, pistons 39, 40, provided with rings 8 are fitted into said bores, and carry axially arranged square headed screws 41, 42, with set nuts 43, 44, springs 45, 46, being inserted between the outer walls of the pressure chamber and discs carried by the screw heads. These heads bear against bell crank levers which are pivoted at 47, 48, to the cylinder head 26. The legs 49, 50, of these levers are held in operative connection with the pistons 39, 40, by means of set screws 51, 52, which also permit, as in the first embodiment, of the adjusting of the pistons during the running of the engine. The legs 53, 54, of the bell crank levers bearing against the flanges 33, are formed as screw bolts and permit a lengthening or a shortening of the leverage. Edge 55 of the contact surface 30 serves as wiping-off means, and groove 56 as an oil draining means. The whole mechanism is shut off from dust and escape of oil by covers 57 and 58.

The operating is as follows:

During the pressure stroke sleeve 27 is pressed against the rotary valve 59, not only by means of springs 36, 36', but also by the pressure in the pressure chamber. This pressure upon the valve would be so considerable that the operation of the valve would be seriously impaired, and an effective lubricating become difficult. This is helped by the pistons 39, 40, which in combination with the bell crank levers pivoted at 47, 48, relieve the rotary valve of too great pressure.

In both embodiments, the contact surfaces with the valve are made prominent to ensure a good tight fit. Sufficient space is provided between the valve and the other bearing surfaces, to permit the expanding of the valve at the working temperature. Since the valve has a relatively large surface, a good cooling is ensured in spite of the play given to this valve.

What I claim is:

1. In a distributing device for a piston engine and in combination, a cylinder, a cylinder head shaped to form a pressure chamber and provided with a seat for a rotary valve, a rotary valve, at least one piston slidably fitted into the wall of the pressure chamber and directly submitted to the pressure in said chamber and showing the combination of an axially arranged headed screw-bolt, a disk bearing on the head of said bolt, a spring inserted between this disk and the outer surface of the wall of the pressure chamber, at least one movable backing of the rotary valve, a bell crank lever pivoted on the cylinder head, one leg of said bell crank lever being adapted to transmit the pressure in said chamber and of said spring to said movable backing, an adjustable screw-bolt arranged on the other leg of said bell crank lever and bearing on the head of said axially arranged screw-bolt of said piston.

2. In a distributing device for a piston engine and in combination, a cylinder, a cylinder head shaped to form a pressure chamber and provided with a seat for a rotary valve, a rotary valve, at least one piston slidably fitted into the wall of the pressure chamber and directly submitted to the pressure in said chamber, supporting means connected with said piston, a spring inserted between the end of the supporting means and the outer surface of the wall of the pressure chamber, at least one movable backing of the rotary valve, a bell crank lever pivoted on the cylinder head, one leg of said bell crank lever being adapted to transmit the pressure in said chamber and of said spring to said movable backing and shaped as an adjustable screw-bolt, an adjustable contactor member arranged on the other leg of said bell crank lever and bearing on the end of said supporting means.

3. In a distributing device for a piston engine and in combination, a cylinder, a cylinder head shaped to form a pressure chamber and provided with a seat for a rotary valve, a rotary valve, at least one piston slidably fitted into the wall of the pressure chamber and directly submitted to the pressure in said chamber and showing the combination of a first axially arranged headed screw-bolt, a disk bearing on the end of said bolt, a spring inserted between this disk and the outer surface of the wall of the pressure chamber, at least one movable backing of the rotary valve, a bell crank lever pivoted on the cylinder head, one leg of said bell crank lever being adapted to transmit the pressure in said chamber and of said spring to said movable backing and shaped as a second adjustable screw-bolt, a third adjustable screw-bolt arranged on the other leg of said bell crank lever and bearing on the head of said first screw-bolt.

4. In a distributing device for a piston engine and in combination, a cylinder and a cylinder head, a working piston in said cylinder, the cylinder head forming the valve casing of a rotary valve and comprising a stationary and a movable part, a rotary valve of said casing, a movable sleeve comprising the movable part of the cylinder-head and serving as a movable backing of the valve, and shaped to form a pressure chamber and a guide for the working-piston, flanges formed on said sleeve, springs seated in the body of the cylinder and adapted to press the backing resiliently against the valve by means of said flanges, at least one piston slidably fitted into said sleeve and directly submitted to the pressure in said pressure chamber, supporting means connected with said piston, a spring inserted between the end of the supporting means and the outer surface of the wall of the sleeve, a bell crank lever pivoted on the stationary part of the cylinder head, one leg of said bell crank lever being adapted to transmit the pressure in said chamber and of said spring inserted between the end of the supporting means to said sleeve by means of said flanges in a direction opposite to the pressure of said springs seated in the body of the cylinder and shaped as an adjustable screw bolt, an adjustable contactor member arranged on the other leg of said bell crank lever and bearing on the end of said supporting means.

5. In a distributing device for a piston engine and in combination, a cylinder, a cylinder head shaped to form a pressure chamber and provided with a seat for a rotary valve, a rotary valve, arched ledges on said cylinder head in a plane perpendicular to the axis of the valve and projecting from the seat for the rotary valve, circular grooves on said rotary valve adapted to serve simultaneously both as a guide and as oil-grooves, said ledges fitting into said grooves on a fraction of the whole circumference of the grooves only, at least one piston slidably fitted into the wall of the pressure chamber and directly submitted to the pressure in said chamber, supporting means connected with said piston, a spring inserted between the end of the supporting means and the outer surface of the wall of the pressure chamber, at least one movable backing for the rotary valve, a bell crank lever pivoted on the cylinder head, one leg of said bell crank lever being adapted to transmit the pressure in said chamber and of said spring to said movable backing, an adjustable contactor member arranged on the other leg of said bell crank lever and bearing on the end of said supporting means.

6. In a distributing device for a piston engine and in combination, a cylinder, a cylinder head shaped to form a pressure chamber and provided with a seat for a rotary valve, a rotary valve tightly closed from the outside, a hollow space in said cylinder head, at least one piston slidably fitted into the wall of the pressure chamber and directly submitted to the pressure in said chamber, supporting means connected with said piston and projecting into said hollow space, a spring inserted between the end of the supporting means and the outer surface of the wall of the pressure chamber, at least one movable backing for the rotary valve, a bell crank lever pivoted on the cylinder head, said backing and said lever lying inside said hollow space, one leg of said bell crank lever being adapted to transmit the pressure in said chamber and of said spring to said movable backing, an adjustable contactor member arranged on the other leg of said bell crank lever and bearing on the end of said supporting means and covers tightly closing said hollow space from the outside.

HANS OESCH.